(12) United States Patent
Brinkmann et al.

(10) Patent No.: US 9,833,736 B2
(45) Date of Patent: Dec. 5, 2017

(54) METHOD AND DEVICE FOR PREPARATION OF COMPRESSED AIR IN MOTOR VEHICLES

(71) Applicant: WABCO GmbH, Hannover (DE)

(72) Inventors: Stefan Brinkmann, Wunstorf (DE); Konrad Feyerabend, Hannover (DE)

(73) Assignee: WABCO GmbH, Hannover (DE)

( * ) Notice: Subject to any disclaimer, the term of this patent is extended or adjusted under 35 U.S.C. 154(b) by 277 days.

(21) Appl. No.: 14/406,071

(22) PCT Filed: Sep. 19, 2013

(86) PCT No.: PCT/EP2013/002836
§ 371 (c)(1),
(2) Date: Dec. 5, 2014

(87) PCT Pub. No.: WO2014/067599
PCT Pub. Date: May 8, 2014

(65) Prior Publication Data
US 2015/0224438 A1  Aug. 13, 2015

(30) Foreign Application Priority Data

Nov. 2, 2012 (DE) .................. 10 2012 021 597

(51) Int. Cl.
*B01D 53/02* (2006.01)
*B01D 53/04* (2006.01)
(Continued)

(52) U.S. Cl.
CPC ..... *B01D 53/0454* (2013.01); *B01D 53/0407* (2013.01); *B01D 53/261* (2013.01);
(Continued)

(58) Field of Classification Search
CPC ........ B01D 2257/80; B01D 2259/4566; B01D 53/0407; B01D 53/0454; B01D 53/261; B60T 17/004
See application file for complete search history.

(56) References Cited

U.S. PATENT DOCUMENTS

| | | | |
|---|---|---|---|
| 6,036,449 A | 3/2000 | Nishar et al. | |
| 2011/0259189 A1* | 10/2011 | Diekmeyer | B60T 17/004 95/10 |
| 2013/0062541 A1* | 3/2013 | Diekmeyer | B60T 13/683 251/12 |

FOREIGN PATENT DOCUMENTS

| | | |
|---|---|---|
| DE | 102004026624 B3 | 12/2005 |
| DE | 102007061417 A1 | 6/2009 |

(Continued)

OTHER PUBLICATIONS

PCT International Search Report dated Apr. 17, 2014.
German Search Report dated Dec. 17, 2012.

*Primary Examiner* — Christopher P Jones
(74) *Attorney, Agent, or Firm* — Brinks Gilson & Lione

(57) ABSTRACT

In a method and a device for compressed air preparation in motor vehicles, ambient air is drawn in and compressed by a compressor (2), dried in a downstream air dryer (4, 4') and delivered to compressed air consumers (storage tanks 14, 16). The air dryer (4, 4') is regenerated with system air stored in a regeneration reservoir (30, 30'), passed via the air dryer (4, 4') and vented via an associated vent valve (22). In predetermined operating states, a switch is made between a delivery phase and a regeneration phase via an electrically controlled governor (36, 36'). The delivery phase of the compressor takes place at least when compressed air consumption is high, and the regeneration phase takes place in (Continued)

the stationary mode at the idling speed of the drive motor, to keep the delivery phases short and to have sufficient time available for regeneration.

5 Claims, 2 Drawing Sheets

(51) Int. Cl.
    *B01D 53/26*     (2006.01)
    *B60T 17/00*     (2006.01)
(52) U.S. Cl.
    CPC ........ *B60T 17/004* (2013.01); *B01D 2257/80* (2013.01); *B01D 2259/4566* (2013.01)

(56) References Cited

FOREIGN PATENT DOCUMENTS

| | | |
|---|---|---|
| DE | 102008053996 A1 | 5/2010 |
| DE | 102008056322 A1 | 5/2010 |
| DE | 102010009035 A1 | 8/2011 |
| DE | 102010018949 A1 | 11/2011 |
| DE | 102010024476 A1 | 12/2011 |

\* cited by examiner

METHOD AND DEVICE FOR PREPARATION OF COMPRESSED AIR IN MOTOR VEHICLES

TECHNICAL FIELD

The invention relates to a method for compressed air preparation in motor vehicles and to a device for carrying out this method.

BACKGROUND

Compressed air supply systems are used in vehicles, especially commercial vehicles, to supply compressed air consumers in the vehicle with compressed air. Such compressed air consumers are service brakes, an air suspension unit, pneumatic transmission shift units or the like, for example. The air drawn in from the environment by the compressor generally contains moisture and impurities. Modern compressed air supply systems therefore comprise a device, referred to here in general as an air dryer, in which the compressed air made available by the compressor is freed from moisture by air drying means and from further condensates and particles by filters and separators in order to prevent damage to or functional impairment of the compressed air consumers.

Typical air dryers employ a desiccant which is regenerated after a certain time in operation by means of system air stored in a regeneration reservoir, passed via the air dryer and vented via an associated vent valve. The regeneration mode generally takes place when the operating pressure has reached a predetermined value, i.e. the compressed air system has been filled. The compressor is then switched over from a "delivery" operating state into a "standby" operating state by means of a governor, which is controlled by the service pressure and is generally pneumatic, preventing the system pressure from rising any further. On the other hand, the air dryer is switched over from a "delivery" operating state to a "regeneration" operating state, wherein the regeneration air taken from the regeneration reservoir generally flows through the air dryer counter to the delivery direction and is vented into the environment via the vent valve. The fixed cycle of "delivery" and "regeneration" predetermined by the system pressure alone does not take account of differences in the level of compressed air consumption and hence differences in the level of regeneration demand. In phases with a very high air consumption, it can happen that the available quantity of air is not sufficient in the case of normal system behavior (delivery up to a cut-off pressure, then one-time regeneration) to ensure sufficient drying, and therefore there is great variation in the quality of the available compressed air, not only from vehicle to vehicle but also during the daily operation of a vehicle.

DE 10 2010 024 476 A1 shows and describes a compressed air control method and a compressed air control device having a pneumatically actuatable governor of the kind already described above. To enable the compressor to be controlled even when the system pressure is not yet sufficient to switch the governor, an additional supply control valve is provided in a compressed air line bypassing the governor, by means of which valve the system pressure inlet can be connected pneumatically to the compressor control outlet in order to switch the operating state of the compressor, irrespective of the system pressure. It is thereby possible to supply the compressor control line with the system pressure, even when the system pressure is not yet sufficient to switch over the venting control valve. In this way, the compressor can be switched off or switched to a "standby" operating state without simultaneously triggering a regeneration process or purging process in the air dryer. The purpose of this measure is to enable the compressor to be switched off when, for example, the entire engine power is required to propel the motor vehicle. As before, control of the air dryer remains dependent on the switching state of the governor, which is controlled pneumatically by means of the system pressure, and therefore more efficient control of the air dryer is not possible.

The use of an electrically controlled governor to eliminate the rigid limits at which the governor switches over is also already known from U.S. Pat. No. 6,036,449. An electronic control device can supply the control line of the vent valve and the control line of the compressor with the current system pressure or vent these two control lines, irrespective of the respective system pressure. In this way, more flexible control of the regeneration of the air dryer is made possible. The purpose of this measure is especially to prevent the cylinder head temperatures of the compressor becoming too high and instead to keep them within predetermined limits so as to prolong the running time of the compressor. However, deliberately efficient control, especially of the air dryer, is not envisaged.

SUMMARY OF THE INVENTION

Given this background, it is the underlying object of the present invention to propose a method for compressed air preparation in motor vehicles and a device for carrying out this method which allow a further optimization of the delivery mode and of the regeneration mode.

The invention is based on the insight that it is possible, through flexible control of the compressor, on the one hand, and of the air dryer, on the other hand, to keep the delivery times as short as possible, with the result that there is more time available for regeneration.

Accordingly, the invention starts, on the one hand, from a method for compressed air preparation in motor vehicles, in which ambient air is drawn in and compressed by a compressor driven by the drive motor of the motor vehicle, dried in a downstream air dryer and delivered to compressed air consumers, wherein furthermore the air dryer is regenerated with system air stored in a regeneration reservoir, passed via the air dryer and vented via an associated vent valve, and in which, in predetermined operating states, a switch is made between a delivery phase and a regeneration phase via an electrically controlled governor. To achieve the stated object, it is envisaged that the driving mode with a high speed of the drive motor is used for the delivery phase of the compressor, at least in phases of high compressed air consumption, and that the stationary mode at the idling speed of the drive motor is at least, but preferably, used for the regeneration phase.

At a high speed of the drive motor, the speed of the compressor and hence the delivery output thereof is also high, with the result that the delivery phase is kept short in terms of time. The regeneration phase preferably takes place in the stationary mode, i.e. when the vehicle is stationary, when the drive motor driving the compressor is at idling speed, which is not the optimum for the delivery mode, i.e. for supplying the compressed air consumers and, in particular, for filling the compressed air storage containers associated therewith.

The method of operation mentioned is not used at all times but preferably only in phases with a particularly high compressed air consumption. In phases with a relatively low or normal compressed air consumption, in contrast, conventional methods of operation are used, e.g. compressed air production in the overrun mode of the vehicle, ensuring that no fuel is consumed in the drive motor to produce compressed air in the coupled compressor. In phases with a relatively low or normal compressed air consumption, the regeneration phase is preferably carried out in the load mode of the drive motor of the motor vehicle.

According to a development of the invention, it is envisaged that one or more regeneration phases with intermediate partial or complete refilling of the regeneration reservoir take place after phases with a high compressed air consumption, irrespective of the current system pressure, i.e. irrespective of whether the current system pressure requires compressed air delivery or not. In the case of a number of successive regeneration phases, there is repeated filling of the regeneration reservoir and respective subsequent regeneration phases, and only partial emptying of the regeneration reservoir is also possible in each case.

According to another embodiment of the method according to the invention, the interval or pressure band between the cut-in pressure and the cut-out pressure of the compressor is reduced and the regeneration frequency is thereby increased in the case of high dryer loading. This measure takes place, even when the cut-off pressure has not yet been reached, whenever the water input, which is calculated for example, reaches or exceeds a predetermined regeneration quantity. These two measures described can also be required and carried out during driving. Complete filling of the system then takes place in an energy-saving manner in the overrun or braking mode of the vehicle, for example.

According to another embodiment of the method according to the invention, further support for the regeneration process is provided by passing system air delivered by the compressor or stored in compressed air storage containers into the air dryer in the regeneration phase, in addition to the regeneration air from the regeneration reservoir. According to the invention, this additionally supplied system air is diverted from an air dryer control line leading from the governor to the vent valve.

A device for carrying out the method according to the invention comprises a compressor which can be driven by a drive motor, an air dryer arranged downstream thereof and having a regeneration reservoir connected to the dryer by a regeneration air line and a regeneration air inlet, and a vent valve for venting the regeneration air, furthermore comprising compressed air consumers arranged downstream of the air dryer, and a governor, which switches over the compressor pneumatically between a delivery mode and a standby mode and, depending on the air dryer, between a dryer mode and a regeneration mode. It is furthermore envisaged, according to the invention, that the governor has an electrically controlled compressor control valve connected to the compressor by a pneumatic compressor control line, and an electrically controlled air dryer control valve connected to the vent valve of the air dryer by a pneumatic air dryer control line. Both the compressor control valve and the air dryer control valve can each be controlled independently of the current system pressure via an electronic control unit (ECU), enabling the above-described processes involved in the method to be optimized according to the present invention.

In order to be able to feed the system air delivered by the compressor or, if appropriate, stored in compressed air containers associated with the compressed air consumers to the air dryer in addition to the regeneration air supplied by the regeneration reservoir, it is envisaged, according to one embodiment of this device, that a second line connected to the regeneration air inlet of the air dryer branches off from the air dryer control line.

Another embodiment envisages that a fourth check valve opening in the direction of the air dryer and a first small orifice are arranged in the branch line just mentioned, wherein the first small orifice is designed in such a way that it ensures a sufficient control pressure for the vent valve on its upstream side, i.e. in the air dryer control line.

According to another embodiment, it is envisaged that the regeneration reservoir is arranged in series between the air dryer and the two compressed air consumers, that the air dryer and the regeneration reservoir are connected to one another by a filling line, in which a fifth check valve opening toward the regeneration reservoir is arranged, that the regeneration reservoir is connected to the air dryer by an emptying line, and that a second small orifice is arranged in the emptying line.

The compressor control valve and the air dryer control valve are each designed as 3/2-way valves, which, in a first switching position, connect a system pressure line to the respectively associated compressor control line and to the air dryer control line and, in the second switching position, separate the respectively associated compressor control lines from the system pressure line and connect them to a vent port.

The invention is explained in greater detail below by means of a number of illustrative embodiments. For this purpose, drawings are attached to the description.

DETAILED DESCRIPTION OF THE DRAWINGS

Figure 1:
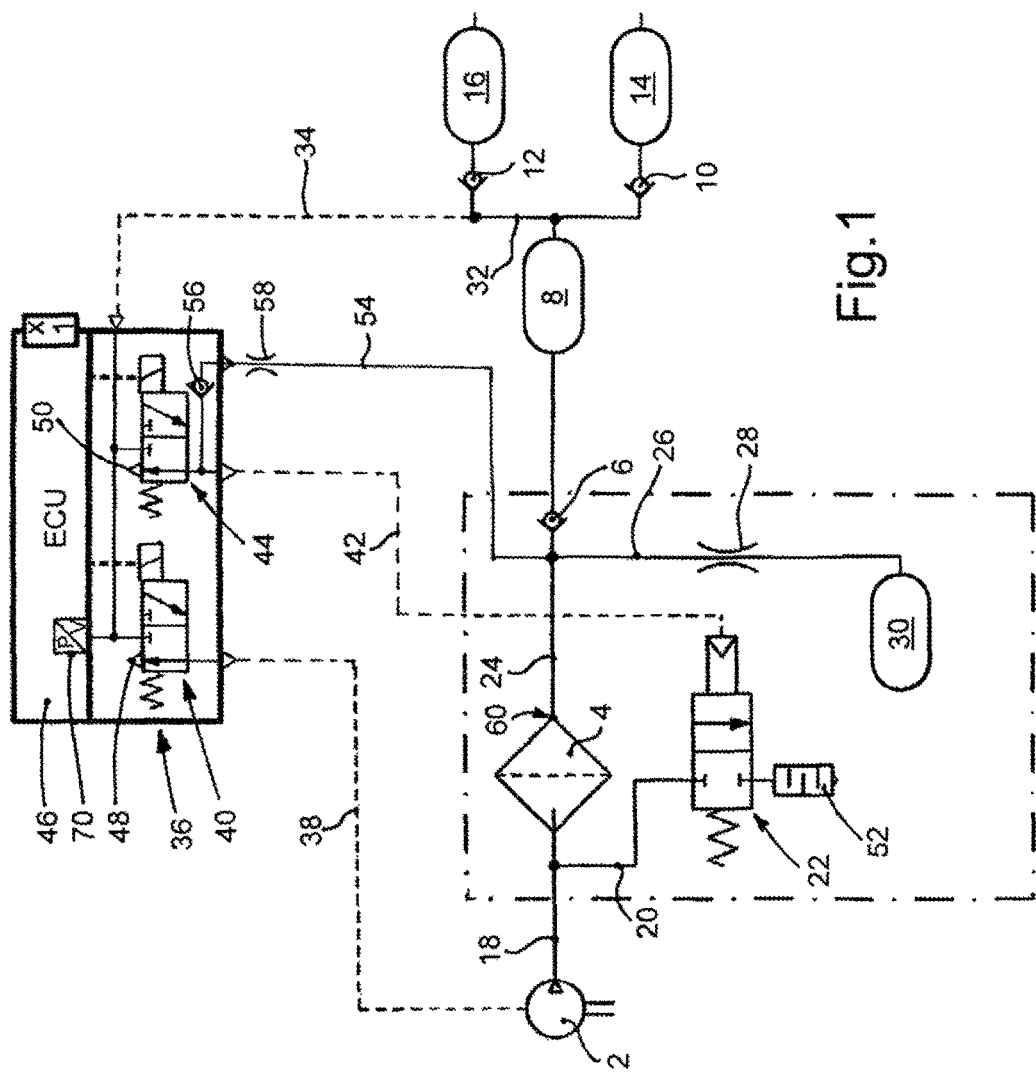
FIG. 1 shows a block diagram of a device for compressed air preparation having an electrically controlled governor.

The device shown in FIG. 1 comprises a compressor 2, which can be driven by a drive motor (not shown) of a motor vehicle, a combined air dryer 4 and air cleaner arranged downstream thereof, and first and second compressed air storage tanks 14, 16 for different compressed air consumers, e.g. a rear axle brake system and a front axle brake system, which are connected downstream of the air dryer and air cleaner via a first check valve 6 and a calming and condensation tank 8 (wet tank) and via second and third check valves 10, 12. Branching off from a first compressed air line 18 arranged between the compressor 2 and the air dryer 4 is a vent line 20, which leads to a vent valve 22. Branching off from a second compressed air line 24 arranged between the air dryer 4 and the calming and condensation tank 8 is a regeneration air line 26, which leads to a regeneration reservoir 30 via an orifice 28.

Branching off from a third compressed air line 32 supplying the two compressed air storage tanks 14, 16 is a system pressure line 34, which leads to a governor 36, which is described in detail below. The device as described thus far has a substantially conventional construction, and therefore the components contained therein and the functions thereof do not need to be explained in detail.

The governor 36 comprises an electrically controlled compressor control valve 40, which is connected to the compressor 2 by a pneumatic compressor control line 38, and an electrically controlled air dryer control valve 44, which is connected to the vent valve 22 of the air dryer 4 by a pneumatic air dryer control line 42. The governor 36 is assigned an electronic control unit 46 (ECU), which can electrically control the compressor control valve 40 and the air dryer control valve 44. The governor 36 has a pressure sensor 70, by means of which the air pressure in the system pressure line 34 can be measured. As illustrated in the figures, the compressed air sensor 70 can be arranged in the control unit 46 or in the calming and condensation tank 8 or in the first or the second compressed air storage tank 14, 16 or directly in the third compressed air line 32 or the system pressure line 34. As is known per se, the measured values from a pressure sensor 70 of this kind can also be transmitted to the control unit 46 of the governor 36 from another control unit, e.g. via a data bus line.

In another embodiment, provision can be made to group all the solenoid valves, namely the vent valve 22, the compressor control valve 40 and the air dryer control valve 44, as well as the control unit 46 in a common housing. It is likewise possible to provide for the vent valve 22, the compressor control valve 40 and the air dryer control valve 44 to be grouped in a control block and flanged to the housing of the air dryer 4. It is likewise possible for the control block comprising the vent valve 22, the compressor control valve 40 and the air dryer control valve 44, and the control unit 46 and the air dryer 4 to be designed as separate units.

The compressor control valve 40 is designed as a 3/2-way valve which, in the switching position illustrated, vents the compressor control line 38 via a first vent port 48 and hence switches the compressor 2 into the delivery mode thereof. In the second switching position (not shown), the system pressure line 34 carrying the system pressure is connected to the compressor control line, thereby switching the compressor 2 into the standby mode thereof.

The air dryer control valve 44 is likewise designed as a 3/2-way valve which, in the switching position illustrated, connects the air dryer control line 42 to a second vent port 50 and hence switches the spring-loaded vent valve 22 into the closed position illustrated. In its second switching position, the air dryer control valve 44 connects the system pressure line 34 to the air dryer control line 42, with the result that the vent valve 22 is switched to a venting position in which the vent line 20 is vented via a muffler 52.

Because of the electric control both of the compressor control valve 40 and of the air dryer control valve 44, the device can be switched to the operating modes described further above irrespective of the system pressure, i.e. irrespective of whether the system has been completely filled or not.

As can furthermore be seen from FIG. 1, there is a branch line 54 branching off from a line segment connected to the air dryer control line 42, via which branch line system air can be supplied via a fourth check valve 56 and a first small orifice 58 to the regeneration air inlet 60 of the air dryer 4 in addition to the regeneration air supplied from the regeneration reservoir 30 in order to accelerate the regeneration process of the air dryer 4. The first small orifice 58 is designed in such a way that a sufficiently high control pressure for control purposes is maintained upstream thereof and hence in the air dryer control line 42. The small orifice 58 can be mechanically closable in order to be able to shut off the branch line when additional system air is not required for the regeneration process.

Figure 2:
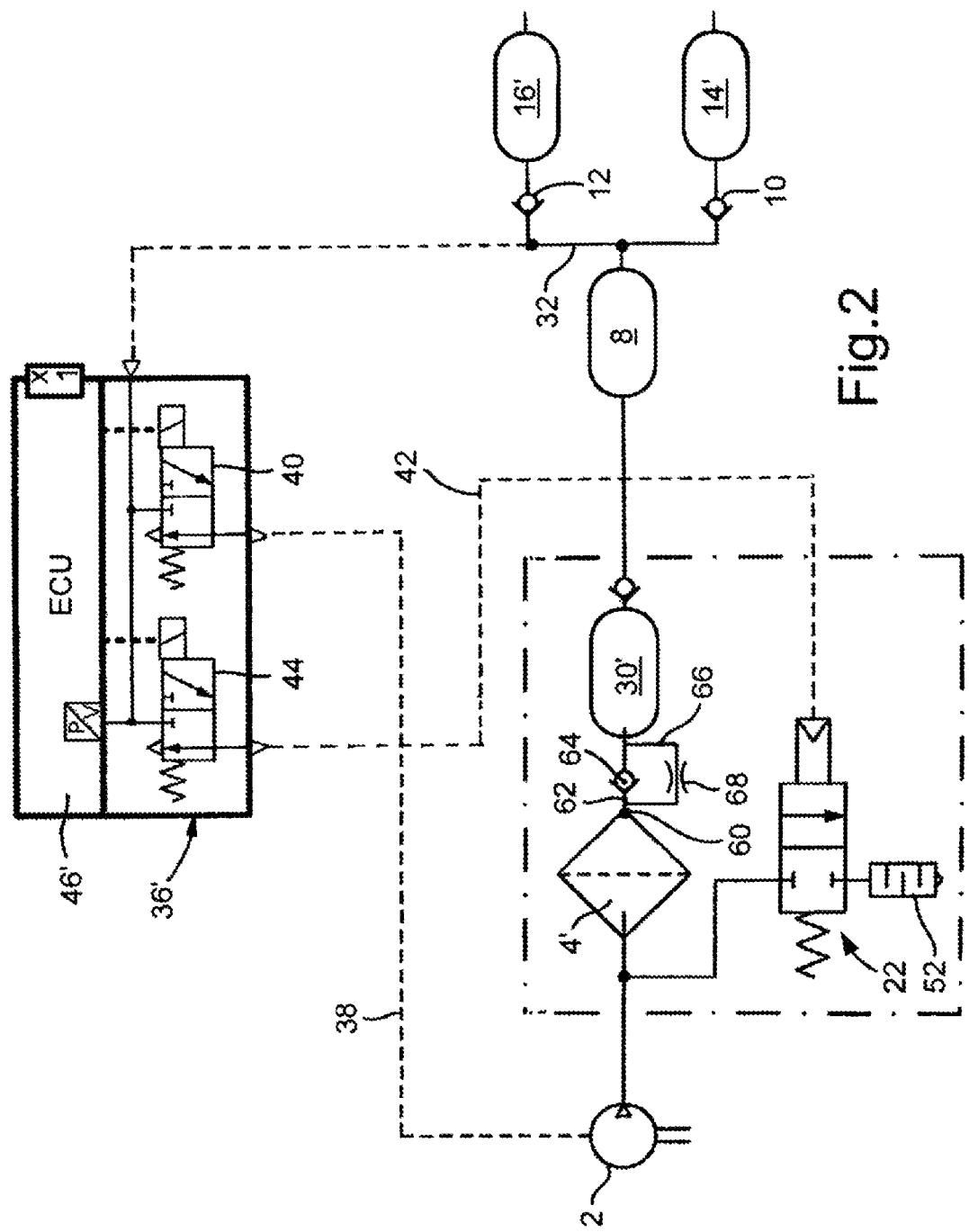
FIG. 2 shows another embodiment of a device of this kind.

The device illustrated in FIG. 2 corresponds substantially in construction to the device according to FIG. 1, and therefore a detailed description of the corresponding components and functions is not required. However, the device according to FIG. 2 differs from the device according to FIG. 1 in two respects:

The system pressure line denoted by reference sign 34 in FIG. 1 is not present in the embodiment according to FIG. 2, and therefore no additional system air can be supplied to the air dryer 4' to assist the regeneration process in the regeneration mode.

In order to facilitate the filling of the regeneration reservoir 30', especially in the case of multiple regeneration processes to be carried out in succession, the regeneration reservoir 30' is arranged in series between the air dryer 4' and the two compressed air storage tanks 14', 16', wherein the filling of the regeneration reservoir 30' takes place via a filling line 62 coming from the air dryer 4' and a fifth check valve 64 arranged in the line and opening toward the regeneration reservoir 30'. The emptying of the regeneration reservoir 30' in the direction of the regeneration air inlet 60 of the air dryer 4' takes place via an emptying line 66 and a second small orifice 68 arranged therein, which corresponds to the orifice 28 in the illustrative embodiment according to FIG. 1. Accordingly, the compressed air does not have to pass through an orifice for filling.

The construction and operation of governor 36' and of control unit 46' interacting therewith correspond to those of governor 36 and control unit 46 in FIG. 1.

While the above description constitutes the preferred embodiments of the present invention, it will be appreciated that the invention is susceptible to modification, variation and change without departing from the proper scope and fair meaning of the accompanying claims.

The invention claimed is:

1. A method for compressed air preparation in motor vehicles comprising the following steps:
   drawing in ambient air;
   compressing the ambient air by a compressor (2) driven by a drive motor of a motor vehicle;
   drying the compressed air in a downstream air dryer (4, 4');
   delivering the dried air to compressed air consumers (14, 16);
   regenerating the air dryer (4, 4') with system air stored in a regeneration reservoir (30, 30'), passed via the air dryer (4, 4') and vented via an associated vent valve (22);
   in predetermined operating states, switching between a delivery phase and a regeneration phase via an electrically controlled governor (36, 36'), wherein a driving mode with a high speed of the drive motor is used for the delivery phase of the compressor (2), at least in phases of high compressed air consumption, and wherein a stationary mode at an idling speed of the drive motor is used for the regeneration phase,
   wherein one or more regeneration phases with intermediate partial or complete refilling of the regeneration reservoir follow after phases with high compressed air consumption, irrespective of a current system pressure.

2. The method as claimed in claim 1, wherein one or more regeneration phases take place, irrespective of a current system pressure, given a maximum permissible water input in the air dryer (4, 4').

3. The method as claimed in claim 1, wherein an interval between a cut-in pressure and a cut-out pressure of the compressor (2) is reduced and hence a regeneration frequency is increased when the air dryer is under a high dryer load.

4. The method as claimed in claim 1, further comprising the step of passing system air delivered by the compressor (2) into the air dryer (4, 4') in the regeneration phase, in addition to regeneration air from the regeneration reservoir (30, 30').

5. The method as claimed in claim 4, wherein the additionally passed system air is diverted from an air dryer control line (42) leading from the governor (36, 36') to the vent valve (22).

* * * * *